(12) United States Patent
Setos

(10) Patent No.: US 10,291,676 B2
(45) Date of Patent: May 14, 2019

(54) METHOD AND SYSTEM FOR THE DELIVERY OF HIGH DEFINITION AUDIO-VISUAL CONTENT

(71) Applicant: Andrew Setos, Pacific Palisades, CA (US)

(72) Inventor: Andrew Setos, Pacific Palisades, CA (US)

(73) Assignee: Setos Family Trust, Pacific Palisades, CA (US)

( * ) Notice: Subject to any disclaimer, the term of this patent is extended or adjusted under 35 U.S.C. 154(b) by 125 days.

(21) Appl. No.: 14/270,559

(22) Filed: May 6, 2014

(65) Prior Publication Data

US 2014/0330938 A1    Nov. 6, 2014

Related U.S. Application Data

(60) Provisional application No. 61/854,999, filed on May 6, 2013.

(51) Int. Cl.
| | |
|---|---|
| *H04L 29/06* | (2006.01) |
| *H04N 21/254* | (2011.01) |
| *H04N 21/258* | (2011.01) |
| *H04N 21/2662* | (2011.01) |
| *H04N 21/274* | (2011.01) |
| *H04N 21/835* | (2011.01) |

(52) U.S. Cl.
CPC ........ *H04L 65/602* (2013.01); *H04L 65/4084* (2013.01); *H04L 65/80* (2013.01); *H04N 21/2541* (2013.01); *H04N 21/25866* (2013.01); *H04N 21/2662* (2013.01); *H04N 21/274* (2013.01); *H04N 21/835* (2013.01)

(58) Field of Classification Search
CPC ........... H04N 21/6125; H04N 21/4622; H04N 21/2393; H04N 21/6175; H04L 65/4076; H04W 4/02; H04W 4/028; H04W 4/18; H04W 12/08; H04W 24/02; H04W 24/08; H04W 28/0226; H04W 28/06; H04W 4/00
See application file for complete search history.

(56) References Cited

U.S. PATENT DOCUMENTS 5,987,524 A * 11/1999 Yoshida .................. H04L 61/00
709/238
8,370,357 B1 * 2/2013 Gudmundsson ... G06Q 30/0603
707/737

(Continued)

OTHER PUBLICATIONS

Society of Motion Picture and Television Engineers (SMPTE) std. 296M:202 May 2012.*

(Continued)

*Primary Examiner* — Arvin Eskandarnia
(74) *Attorney, Agent, or Firm* — Ohlandt, Greely, Ruggiero & Perle, L.L.P.

(57) ABSTRACT

A system for delivery of owned High Definition audio-visual content to a location selected by a user is provided. The system includes a central facility for the storage of the content, and two or more local networks operatively connected to the central facility for receipt of the content from the central facility. One local network has a dedicated high bandwidth data line to the location of the user, and the dedicated data line transmits of the content as high definition content, and the transmission is such that it allows for immediate play.

14 Claims, 6 Drawing Sheets

(56) References Cited

U.S. PATENT DOCUMENTS

| | | | |
|---|---|---|---|
| 2004/0196972 A1* | 10/2004 | Zhu | G06Q 20/382 380/45 |
| 2007/0157252 A1* | 7/2007 | Perez | G06Q 30/02 725/61 |
| 2007/0276925 A1 | 11/2007 | La Joie | |
| 2007/0276926 A1 | 11/2007 | La Joie | |
| 2008/0155613 A1* | 6/2008 | Benya | H04N 7/17318 725/89 |
| 2008/0162156 A1* | 7/2008 | Fein | G06F 17/30058 705/1.1 |
| 2009/0070122 A1* | 3/2009 | Hauck | G06F 21/10 705/313 |
| 2009/0083813 A1* | 3/2009 | Dolce | H04N 7/16 725/93 |
| 2010/0037253 A1* | 2/2010 | Sheehan | H04H 20/103 725/31 |
| 2010/0169941 A1 | 7/2010 | Granzer | |
| 2010/0208634 A1* | 8/2010 | Eng | H04L 45/00 370/310 |
| 2011/0055882 A1* | 3/2011 | Ohya | H04N 21/23439 725/93 |
| 2012/0227066 A1* | 9/2012 | Woxblom | G06F 21/10 725/25 |
| 2012/0233067 A1* | 9/2012 | Matthew | G06Q 50/10 705/40 |
| 2012/0284802 A1* | 11/2012 | Hierro | G06F 21/10 726/27 |
| 2012/0291104 A1 | 11/2012 | Hasek | |
| 2013/0191872 A1* | 7/2013 | Lee | H04N 21/63 725/78 |
| 2013/0263192 A1* | 10/2013 | Woxblom | H04L 12/2812 725/85 |
| 2014/0082681 A1* | 3/2014 | Brown | H04N 21/64723 725/98 |
| 2014/0092314 A1* | 4/2014 | Tsinberg | H04L 12/6418 348/734 |

OTHER PUBLICATIONS

International Telecommunications Union (ITU) ITU-R BT.709-5 Part 2 Jun. 2015.*
International Telecommunications Union (ITU) ITU-R BT.2070 part 0 Aug. 2012.*

* cited by examiner

METHOD AND SYSTEM FOR THE DELIVERY OF HIGH DEFINITION AUDIO-VISUAL CONTENT

RELATED APPLICATION

This application claims priority in U.S. application Ser. No. 61/854,999 filed on May 6, 2013 that is incorporated herein by reference.

BACKGROUND OF THE DISCLOSURE

1. Field of the Disclosure

The present disclosure relates to a system and a method for delivery of high definition audio-visual content to a user's location and storage of the high definition content. More particularly, the present disclosure relates to a system and a method of high performance delivery of high definition audio-visual content to multiple locations, which locations are designated by the ultimate user.

2. Description of the Related Art

For over thirty years, the consumer marketplace for the residential consumption of long-form audio-visual content has been robust. This sort of content distribution, where discrete titles or groups of titles of content are acquired by the consumer for perpetual (e.g., purchase, sell-through) or limited (e.g., rental) viewing, allows the consumer to own or rent content for a period of time, controlling the viewing of it as he or she desires.

This ability for the consumer to control viewed content is different than streaming services introduced thirty years earlier, first as broadcast television and then expanded in the form of source providers (i.e., "linear channels") via cable, satellite and other real-time means. With consumer ownership or rental, content and viewing times are determined by the consumer, not the source provider. This consumer ownership convenience is the foundation of the packaged media sell-through industry, coupled with the consumer's ability to view or use the content multiple times without further cost.

Based on industry data, consumers continue to desire to "purchase" audio-visual content. This is in spite of the availability of very low cost fees (~$1.00/day) for the "rental" of discrete titles.

In the mid-1990s, video on demand ("VOD") was introduced, providing audio-visual content and associated data to the homes connected to a particular network. VOD services are now available in all parts of the world. The United States has the highest global take-up rates of VOD.

The distribution of audio-visual content today is essentially all digital, whether it be packaged media or via electronic means. The large distribution of a single signal makes streaming VOD impractical for most satellite TV. Satellite TV may offer VOD programming to its subscribers through a service that downloads the content to a subscriber's digital video recorder via non-satellite means, e.g. through the Internet, so that the subscriber can watch, play, pause, and seek at their convenience. Cable operators' offer of VOD, and digital video recorders, such as TIVO, have taught the consumer that the convenience of packaged media can be enjoyed without the time and effort of shopping in physical retail stores to acquire the content carrier (e.g. a DVD).

Streaming VOD systems, e.g. Netflix, are available on desktop and mobile platforms. However, there are limitations with this approach.

The "remote-control, on-demand" culture is almost half of all residential viewing and is beginning to dominate and materially alter viewing habits even of linear channels (LA Times 2/14/13, "FOLLOWERS watch on own time"). Convenience of choice and time is driving this behavior. However, the desire to "purchase" content has not yet surfaced significantly in the digital delivery industry. Thus, packaged media continues to be the choice for consumers to "purchase" long form audio-visual content (Variety, Jan. 31, 2013 "Discs still dominate homevid").

Even though the content industry (the six major motion picture studios and several independent producers and distributors) has licensed many digital distribution companies that offer all current business models of "sell-through", "rental" and "subscription", sell-through still lags far behind what packaged media purchases would suggest. Indeed, whenever a new sell-through offering is announced there is significant consumer uptake (Variety, February 15 "Sony CEO: Bust windows") that quickly fizzles. The widely observed behavior of consumers that have embraced "on-demand" viewing and the continued robust packaged media sales suggests that there is a fundamental flaw in the current way to offer consumers digital delivery of "sell-through" audio-visual content.

Storage of audio-visual content in the home, just as optical media, such as the DVD, is now stored, assures the consumer that access to his or her sell-through content is never in doubt. However the digital storage of downloaded audio-visual content or "large objects" ranging in size from 1-10 GB of data, in the residential setting, is problematic. Costs are high, and the method to overcome the inevitable failure of technology, such as arrays of redundant hard drives, has heretofore appeared not practical.

Consumer use of the Internet to access remote storage for digital content files ("large objects") has become popular and has recently been marketed under the euphemism of the "cloud" by companies such as iTunes. However, the Internet cannot be relied upon to service the "main room" viewing experience for VOD premium High Definition audio-visual content without very high cost access fees (currently $70 to $150/month). This pricing model is likely to increase, not decrease. Indeed, it is generally believed that High Definition audio-visual, on-demand performance that would visually compete with the current two leaders in premium sell-through, Blu-Ray optical disc and iTunes (the latter using "progressive download" that results in significant wait times, for example 5 minutes or more, rather than instantaneous viewing, e.g. within seconds and less than one minute) is only extant in 10% of US households to enable immediate play.

Contention based networks, such as the Internet, are very cumbersome and costly to engineer to guarantee performance for audio-visual content streaming. It is a fundamental characteristic of the various contention network technologies such as terminal control protocol/internet protocol ("TCP/IP"), Ethernet, and the like. A good example is the recent difficulty of HBO GO subscribers had to access Game of Thrones (Variety, 6 Apr. 2014). Thus, if storage in the home is not practical, and storage off premises, while practical, cannot be satisfactorily accessed using contention based network technology, as demonstrated by the Internet, there is a need for a solution to this problem.

SUMMARY OF THE DISCLOSURE

The present disclosure provides a system and a method of high performance delivery of high definition audio-visual content to the ultimate user, the consumer.

The present disclosure also provides such a system and a method of high performance delivery of high definition audio-visual content to multiple locations designated by the consumer.

The present disclosure further provides a system and a method for providing electronic sell-through offerings of High Definition digital audio-visual content that is acceptable to a consumer when viewed on a TV screen 42" or larger in the home or residence of the consumer.

The present disclosure still further provides a system and a method for delivering reliable, high performance electronic streams while at the same time assuring the consumer who owns the content, that the content is securely stored at a location preferably not at the consumer's residence, and as accessible to the consumer as packaged media.

The present disclosure provides a system and method that uses high bandwidth connection(s) and certain compression rates, along with an interconnecting facility, to ensure availability regardless of the change in residence locations.

The present disclosure allows enterprises to offer a consumer, High Definition audio-visual content that is immediately available for enjoyment by the consumer with a visual quality that is competitive with the highest standard available today and that is available regardless of a future residential relocation, as well as accessible at temporary locations.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but are not limited to, the present disclosure. These drawings include the following figures, in which like numerals indicate like parts.

DETAILED DESCRIPTION OF THE DISCLOSURE

Figure 1:
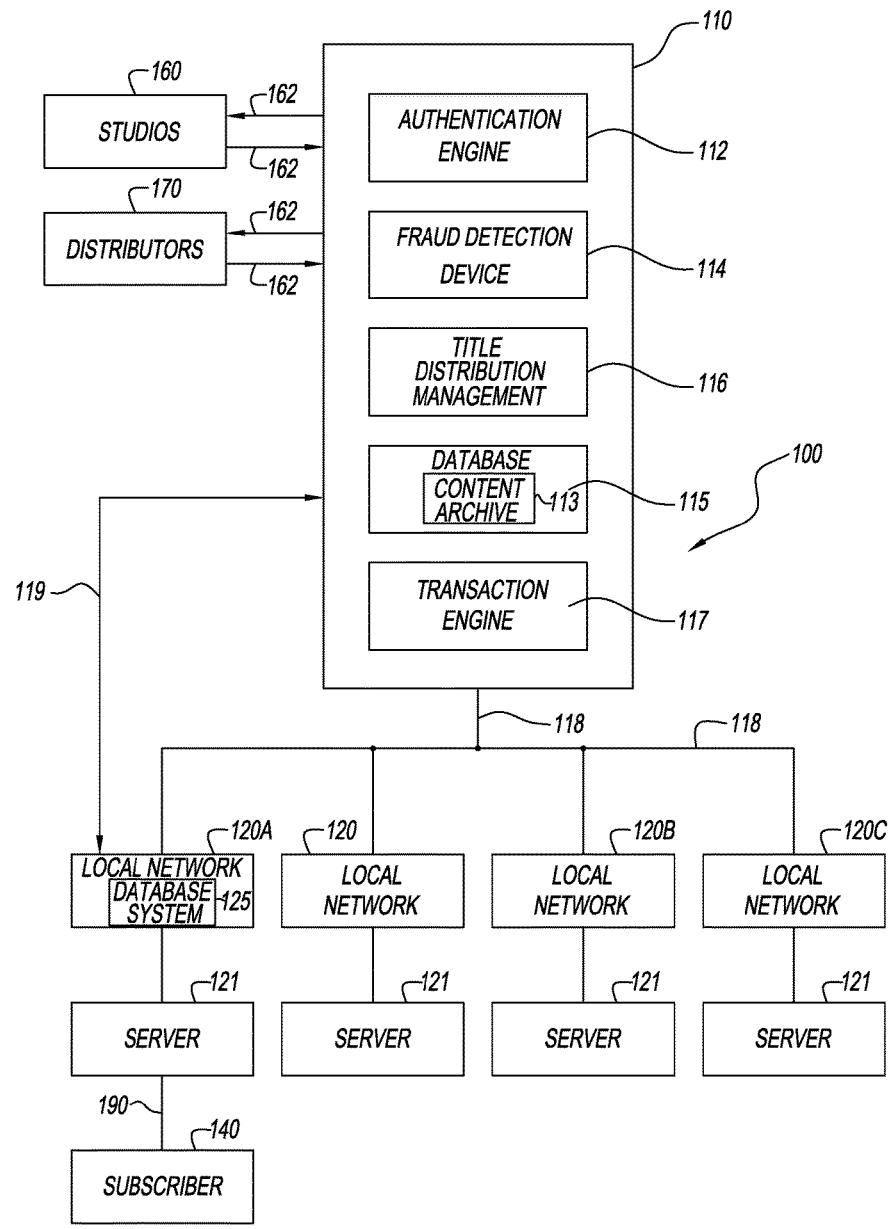
FIG. 1 is a schematic of the overall audio-visual content flow according to the present disclosure.

The present disclosure provides for a system and a method for residential use that, through proper capacity and adequate bandwidth, assures continuous delivery of High Definition audio-visual content. Further, the present system and method achieves this without significant delay in start time, e.g. several minutes or longer, and without the need for local storage, e.g. progressive download. The audio-visual content is viewable on a High Definition TV screen in the home or residence of the consumer or user.

High Definition as used herein can be distributed in many technical forms. High Definition Format has several meanings. These meanings or standards are: for "live action" content, such as sports or other production intended to convey a live character, as per Society of Motion Picture and Television Engineers (SMPTE) ST 296M:2012, High Definition content uses frame rates above 50 per second. Note that approximately 80% of professional and college sports events in the United States are captured and distributed using that standard. For scripted content, such as motion pictures and episodic television programs as per the International Telecommunications Union Rec. ITU-R BT.709-5 Part 2, High Definition content uses frame rates of 23.97 and 24 per second and progressive scan (and in the near future REC. ITU-R BT.2020 as amended).

According to the present disclosure, the access of such large objects, as High Definition audio-visual content, streamed to the main viewing location in a home requires a certain high bandwidth in order to deliver the content without delay or interruptions and with the content having a certain, desired visual quality. In order to do so, it has now been found that certain data rate parameters must be assured to realize this visual quality.

Each data rate is a function of two parameters, namely the particular High Definition Format and the type or scheme of Image Compression employed. There are three well-known Image Compression schemes, namely MPEG-2 (ISO/IEC 13818), MPEG 4 Part 10 (ISO/IEC 14496-10), and MPEG H (ISO/IEC 23008). Each pair of these parameters, namely High Definition Format and Image Compression scheme, requires two different data rates to achieve "visually lossless" results, or a Peak Signal to Noise Ratio (PSNR) of at least 42 decibels, depending on the network's implementation. If using "variable bit rate" (VBR) coding, the bit rate is chosen for constant PSNR, e.g. quality, with an average rate and a maximum or peak rate. If the "constant bit rate" (CBR) is chosen, a single bit rate is chosen to achieve the target PSNR throughout the content, then the sustained rate is the same value as the peak rate.

The preferred Data Rates that can be used in the present disclosure are:

| DATA RATES, in Megabits per second | | | | | |
|---|---|---|---|---|---|
| | MPEG 2 | | MPEG 4 Part 10 | | MPEG H |
| | average | maximum | average | Maximum | average | maximum |
| SMPTE 259M | 7.5 | 15 | 4 | 10 | — | — |
| ITU REC 709 | 10 | 20 | 5 | 10 | 3 | 8 |
| ITU REC 2020 | — | — | — | — | 8 | 15 |

The systems and methods of the present disclosure need to assure data rates such as the above in order to achieve the objects of the present disclosure. To do so, a dedicated "channel" is assigned to the subscriber that meets the criteria of bandwidth. For example, it has now been found that the use of Frequency Domain Multiplexed (FDM) channel is a preferred dedicated "channel" that is a fixed bandwidth. The fixed bandwidth should be approximately 39 megabits per second. This dedicated or reserved channel with fixed bandwidth remains as long as the subscriber is viewing content. This is significantly different than the Internet that uses TCP/IP networking protocol (IETF RFC 1122) and Internet-like networks, such a local area networks using Ethernet protocol (IEEE 802.3). In the Internet, a "shared" bandwidth amongst the users is employed. In such Internet cases, the resources, in this instance data rate, made available to convey audio-visual content (namely, moving pictures with sound) varies for each user depending on the requests of resources of all other users. To compensate in such Internet cases, a technique called "adaptive bit rate encoding" (ABR)

is employed where the PSNR is variable as a function of network resources rather than content requirements to achieve a certain visual quality level, and the consumer is subjected to an undesirable variability of visual quality. Again, the Internet exhibits the exact obverse of the goal of the present disclosure in which the resource assigned is the data rate required to convey the content with a constant visual quality based on its image complexity requires a dedicated channel with a fixed bandwidth.

Referring to the drawings and, in particular, the present system is generally designated as reference numeral 100. System 100 has a central facility 110 that manages a database 115 of consumers or subscribers, and one or more local network operators or networks 120. Each local network 120 has agreed to become part of system 100. Local network 120 is connected by a reserved or dedicated, duplex communication line 190 to a subscriber 140. Communication line 190 is the reserved or dedicated bandwidth channel or duplex communication line having the fixed bandwidth discussed above. Preferably, communication line 190 is a Frequency Domain Multiplexed (FDM) channel.

According to an embodiment of the present disclosure, subscriber 140 will always have access to his content regardless of where he/she is located or may relocate, provided he/she has access to a local network 120 that is part of system 100. System 100 provides connectivity to local networks 120. Each local network 120 is selected to be part of system 100, since each local network 120 will provide an adequate coverage of the territory. Thus, subscriber 140 is assured, and potential subscribers are assured, that each subscriber will have access to the content that is associated with that subscriber, i.e. the subscriber's "owned" content. As used herein, owned means content that has been purchased or otherwise acquired, such as gifted, and for which ownership resides in that subscriber.

In central facility 110, the audio-visual content that each subscriber has acquired, e.g. content now owned by each subscriber, are compiled in database 115. As shown, database 115 is in central facility 110. However, database 115 can be operatively connected (not shown) to central facility 110. From the central facility 110, each identified local network 120 is operatively connected by communication line or pipe 118. The connection of communication line 118 of the central facility 110 to each identified local network 120 serves two purposes. First, central facility 110 is a clearinghouse for the list of content, names that the subscriber or subscribing consumer or user has accumulated (owns), i.e. rights, and therefore can be transferred between or amongst local networks 120 in system 100. Second, central facility 110 provides access to each subscriber's rights, such as ownership of content, when the subscriber is "visiting" another local network 120. Also, the rights information in central facility 110 ensures that all owned audio-visual content for each subscriber is available in all local networks 120 that are part of system 100. This assurance can be done in several ways, preferably by the methodology of first comparing a master list of all owned content with the actual content resident in each server 121 in each local network 120. If not present, central facility 110 will deliver, via a network transaction, the missing content to local networks 120 in system 100 that do not already have them in their network servers 121.

Central facility 110 uses traditional duplex data communication lines 118 and studios 160 and/or distributors 170 use traditional duplex data communication lines 162 to send content to the local networks 120. These transmissions or communication lines 118 and 162 are not for direct use by subscribers 140. Significantly, local networks 120 use their reserved bandwidth channel or duplex communication line 190 shown in FIG. 1 to deliver content to their subscribers 140 from their local network servers to local network 120. By way of example, when subscriber 140 purchases or otherwise obtains audio-visual content, local network database or database system 125 communicates with central facility 110 via communication line 119 and deposits the purchase information. This is called "rights management" in that the rights obtained by subscriber 140 have been stored so that when temporary access requests are made by subscriber 140 or when the subscriber relocates to another local network 120 territory the rights or list of rights of that subscriber 140 are transferred to another local network 120.

Also shown in FIG. 1 are the various studios 160 and distributors 170 (only one of each is shown) that use a communication line 162 to deliver content to the central facility 110. Various studios 160 and distributors 170 can use communication line (not shown) to deliver content directly to local networks 120. Once delivered to local network 120, the content is available for purchase (or other acquisition) by subscriber 140. Once purchased or acquired, and thus owned by subscriber 140, local network 120 where the content was previously is immediately available for view, and notifies the central facility 110 via communication line 119. Central facility 110 then notifies all other local networks 120 in system 110 that the title is owned via communication line 119.

When subscriber 140 moves to another local network 120, that subscriber will authenticate himself or herself, using their previously assigned sign-on and password and/or other credentials with the new local network 120. The new local network 120 will report the subscriber 140 to central facility 110. Central facility 110 will deliver the list of audio-visual content that is owned by subscriber 140, i.e. the rights. As content is owned (including purchased), the central facility 110 compares, using conventional means, the subscriber's content rights against the content already in all local network servers. Missing content will be delivered to the all local networks as content becomes owned. This can occur when local network 120A licenses content that is not licensed and offered for sale by all other local networks. In this way, the subscriber will always have access to his/her content immediately regardless of where the subscriber relocates to or attempts to access owned content from a local network on a temporary basis.

It is important to note that while the list of owned content is unique to subscriber 140, the content of that list that is required to be transmitted by server 112 of central facility 110 to server 121 of local network 120 via communication line 118 is only that content that does not already exist on server 121. Importantly, that content on server 121 is accessible by all subscribers of local network 120 and is achieved in system 100 by accessing the single instantiation of the content in question. This feature is of significant importance in that it achieves efficiency of transmission from central facility 110 to local network 120 via communication line 118 and efficiency of the total required capacity of server 121 of local network 120.

Figure 2:
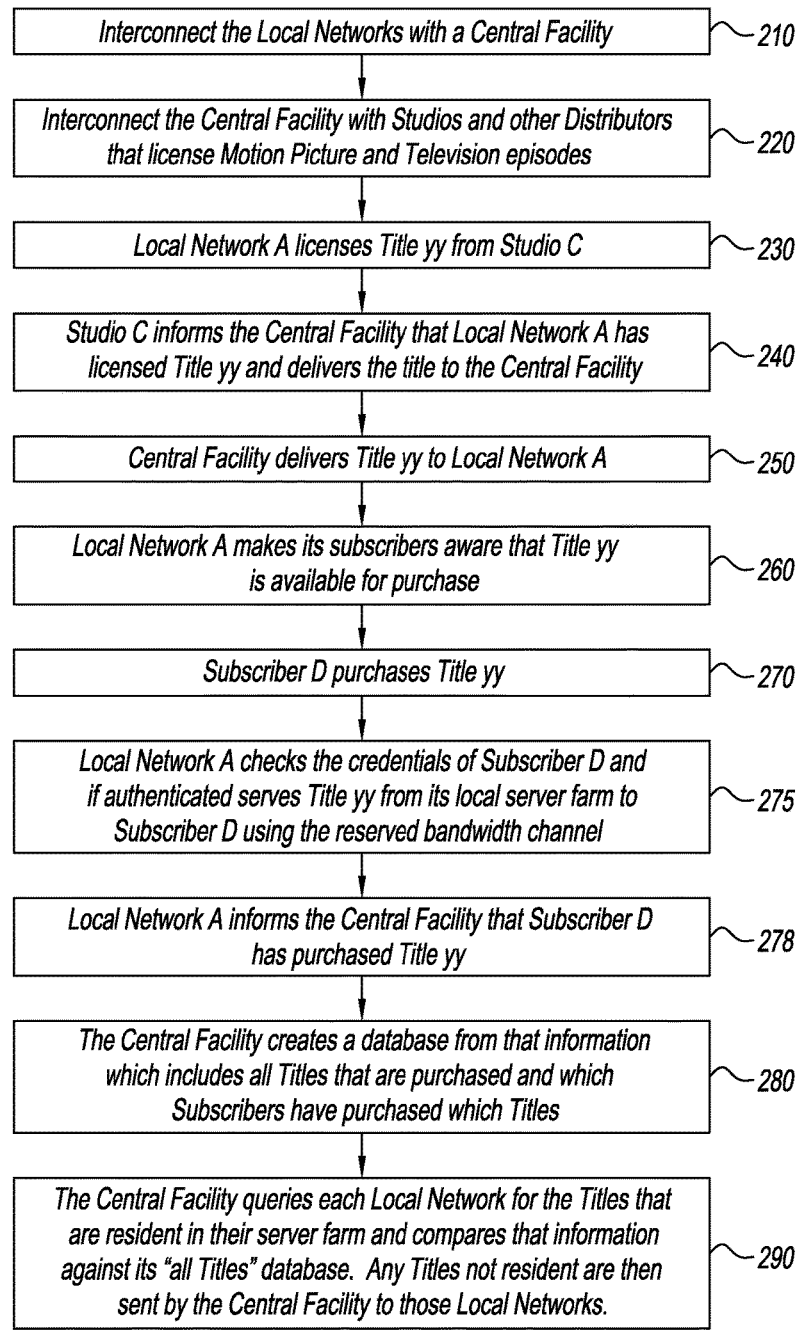
FIG. 2 is a flow diagram of content flow of FIG. 1.

Referring to FIGS. 1 and 2, the system 100 of the present disclosure includes the following protocol. As shown at 210, local networks 120 are connected with central facility 110 via communication lines 118 (shown in FIG. 1). At 220, central facility 110 is also connected to one or more studios 160 and other licensors or distributors 170, shown in FIG. 1, that license Motion Picture and Television episodes. Local network A of FIG. 2 (shown as local network 120A in FIG.

1) licenses audio-visual content, i.e. Title yy from a Studio C (shown as studio 160 in FIG. 1), at 230. At 240, Studio C then informs central facility 110, via communication line 162 of FIG. 1, that local network A (120A) has licensed Title yy. Also, Studio C delivers Title yy to central facility 110. At 250, central facility 110 delivers Title yy to local network A via communication line 118 of FIG. 1. Local network A makes its subscribers aware that Title yy is available for purchase at 260. At 270, Subscriber D purchases Title yy. At 275, local network A checks the credentials of Subscriber D and if the credentials are authenticated, sends Title yy from its local server 121 to Subscriber D, namely 140 of FIG. 1, significantly, using reserved bandwidth channel, namely 190.

At 278, local network A then informs central facility 110, via communication line 119, that Subscriber D has purchased Title yy. At 280, database 115 of central facility 110 receives that information that includes all Titles that are purchased and which subscribers have purchased which Titles. At 290, central facility 110 queries, using communication line 119 of FIG. 1, each local network (local network 120 of system 100) for the Titles that are resident in their server 121 and compares that information against all Titles in database 115. Any Titles not in any database 125 of any local network 120, i.e. missing, is then sent by central facility 110 to those local networks 120 missing the Title.

Referring to FIG. 1, central facility 110 uses communication line 118 to deliver audio-visual content to each of its local networks 120 that, in turn, delivers audio-visual content for viewing in real time to subscriber D in his/her residences using set top boxes that, in turn, convey the content to television displays using the universally available and standard data connection HDMI or whatever technology replaces it. It is understood that some local networks 120 may have arranged for their STB functionality to be within the TV display. As noted above in discussing local networks 120, system 110 should have a large number of local networks 120, which in turn have a large enough territorial range to ensure virtual universal coverage of the desired territory, e.g. the USA, North America, and the like.

In an embodiment of the present disclosure, central facility 110 can distribute content to local networks 120 when local network 120 has licensed content for purchase by subscribers 140, or the local networks 120 can arrange to have content delivered directly from the studio 160 or distributor 170. In all cases, central facility 110 does not fulfill subscriber requests directly, local network 120 does the fulfillment.

Content delivery to local networks 120 from central facility 110 shall be accomplished using any means available, including the Internet, since this step does not include delivery for direct consumption by subscriber 140 that requires the dedicated fixed bandwidth channel 190. The master file of the content provided by the copyright licensor, such as studio 160 or distributor 170, to the central facility 110 will be compressed by, for example, using JPEG2000 as per ISO/IEC 15444-1, with a data rate sufficient to ensure the highest quality, approximately 200 Megabits per second. The compression technology, file structure and other parameters delivered to each local network 120 will be tailored to the local network's requirements by central facility 110, whether it be standardized which is a public, voluntary Standard, such as by the Society of Cable TV Engineers, SCTE, for example, or proprietary. However, in all cases, the delivery to such local networks 120 will be at such rates to deliver the target PSNR. In this way, the highest and consistent quality possible will be enjoyed by subscribers 140, regardless of network conditions.

Referring to FIG. 1, central facility 110 includes an authentication engine or system 112, a fraud detection protocol or device 114, a title distribution programming or management 116, and a transaction engine 117, as well as the database 115.

Authentication system 112 compares business rules with the requests made by subscribers 140 attempting to access Titles. These rules can include various requirements, such as, for example, a) only one location can view a particular title at a time, and b) flag suspicious use patterns at "temporary" locations for further analysis to protect against fraud or secondary markets. Authentication of logon and password will include heuristics to enforce contractual rules including the number of titles viewed simultaneously per subscriber, location of access attempts, the simultaneous viewing of a title and the pattern of access attempts.

Fraud detection protocol or device 114 is any such protocol or device that is commonly known in the art that virtually guarantees the confidentiality and accuracy of the information in central facility 110.

Typically, title distribution programming or management 116 will facilitate the use and control to be provided for the titles owned including those purchased, titles offered by all local networks 120, subscribers' password and logon names, and the name of titles that each subscriber has purchased and continues to own. Other categories of data can be added to the database management as desired.

In central facility 110, there is included the credentials and other account information of all subscribers 140. These credentials preferably include the login credential, such as an email address or substitute user name, an email address or other way of communicating with subscriber 140 such as a USPS address, local network 120 of the subscriber, and a password. This information is forwarded by each local network database 125 via communication line 119 to central facility database 115. Additional account information includes all content that is owned by subscriber 140. Central facility database 115 can also include a database of all local networks. These two databases are convolved to create a list of all content that resides at the server of each local network 120.

With the present disclosure, central facility 110 provides continuous updates of owned content and will inform each licensor of what titles to be delivered to its master content archive 113 in database 115. While content archive 113 is shown in database 115, content archive 113 can be located remote from but operatively connected to database 115 and central facility 110.

Figure 3:
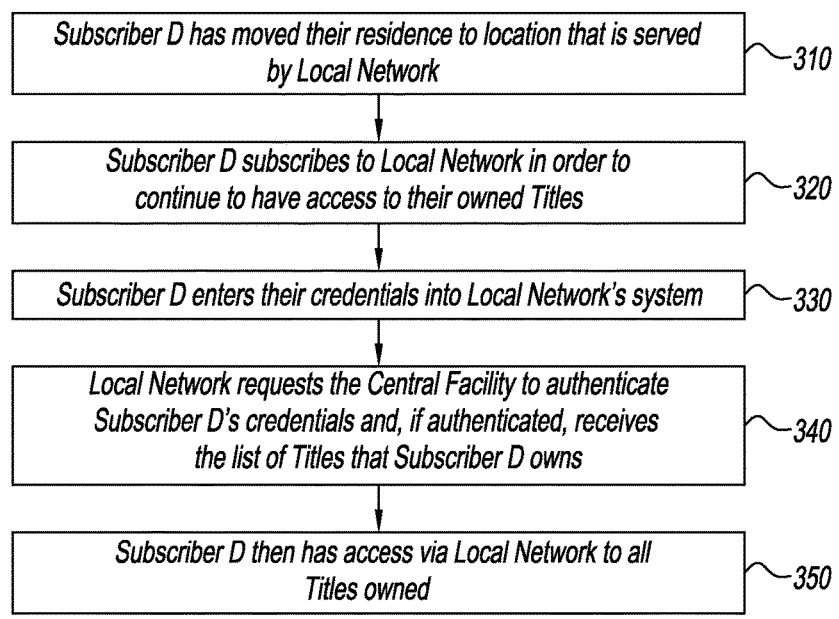
FIG. 3 is a flow diagram of a consumer moving to another local network within the system of the present disclosure.

Referring to FIGS. 1 and 3, when a subscriber 140, again called Subscriber D for purposes of this discussion, relocates to another or new local network (shown as local network 120B in FIG. 1), the identity of subscriber D is transmitted by local network 120B to central facility 110 using communication line 119, the list of owned content or rights that the relocated subscriber D is associated with is forwarded by central facility 110 to the local network 120B. In this way, local network 120B (which already has all contents that all subscribers D own) has all the rights associated with subscriber D.

What transpires is shown in FIG. 3. At 310, subscriber 140, shown as Subscriber D in FIG. 3, has moved his/her residence to location that is served by the new local network. Subscriber D subscribes at 320 to the new local network in order to continue to have access to his/her owned Titles. At 330, Subscriber D enters his/her credentials into the new local network. At 340, the new local network requests central facility 110 to authenticate Subscriber D's credentials. If authenticated, the new local network receives the list of Titles owned by Subscriber D. At 350, subscriber D then has access via the new local network to all Titles owned to date.

Figure 4:
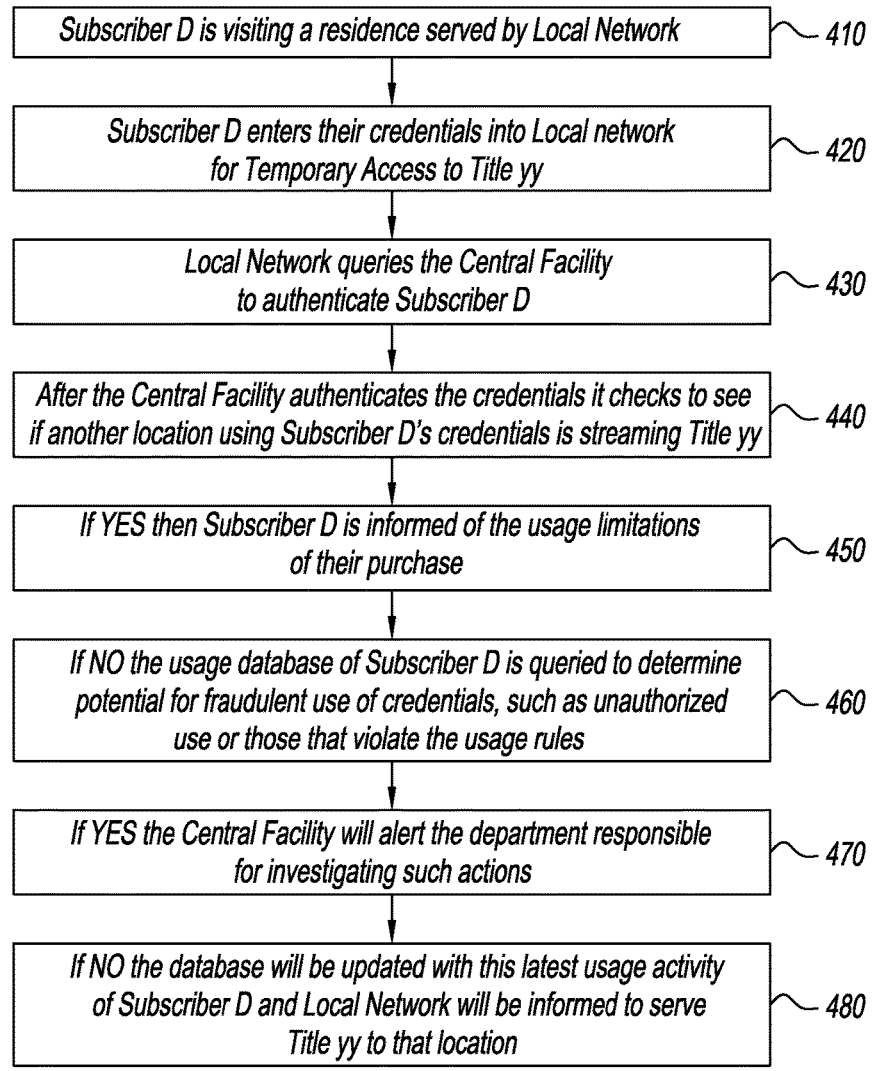
FIG. 4 is a flow diagram of a consumer receiving temporary access to the system of the present disclosure.

Referring to FIG. 4, at 410, subscriber D visits a residence served by another local network, shown as local network 120C in FIG. 1. At 420, subscriber D enters his/her credentials into the visited local network for Temporary Access to Title yy. At 430, the visited local network queries central facility 110 of FIG. 1 to authenticate Subscriber D. After central facility 110 authenticates the credentials, at 440, a check is performed to determine whether another location using Subscriber D's credentials is streaming Title yy. At 450, if YES, then Subscriber D is informed of the usage limitations of his/her rights. At 460, if NO, the fraud system or device 114 is queried to determine potential for fraudulent use of credentials, such as unauthorized use or those that violate the usage rules. At 470, if the answer is YES, central facility 100 alerts the department responsible for investigating such actions. At 480, if the answer is NO, database 115 will be updated with this latest usage activity of Subscriber D and the visited local network will be informed to serve Title yy to that location.

In one limited embodiment of the present disclosure, a subscriber relocates to a region without an available local network 120 of system 100. For this one embodiment, High Definition audio-visual content will be made available using any available network as long as the progressive download approach is also used. A backup local network system (not shown) relies on the Internet to ensure that even in the extreme case of no access to a desired local network 120, the subscriber is assured that the subscriber's owned content will continue to be available. The method for delivery in this embodiment will be the Internet where central facility 110 connects to the Internet and the content flows into the home via a broadband connection into the home and uses the progressive download method, so that even if the start time varies depending on connection speed, the visual quality of the user's experiences remains high.

Figure 5:
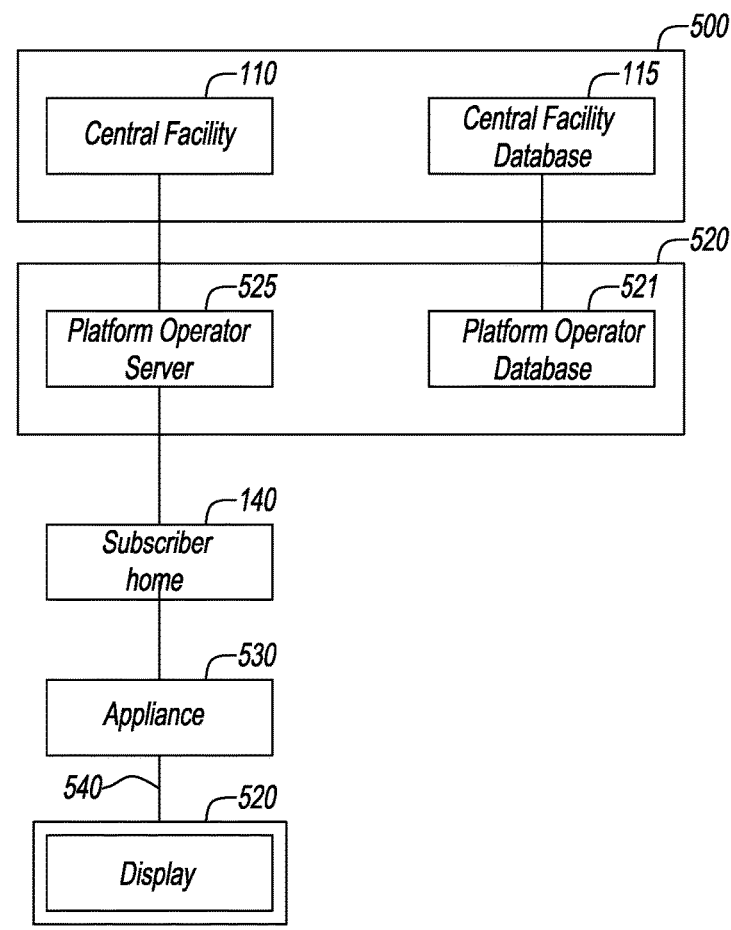
FIG. 5 is diagram of the delivery of the audio-visual content from the storage location to the user illustrating another embodiment of the present disclosure.

Referring to FIG. 5, subscriber 140 relocates to a region without a local network available. Obviously, reserved, fixed bandwidth channel 190 is not available. Thus, the High Definition audio-visual content will be made available using any available network 500 with the progressive download approach in place of reserved, fixed bandwidth channel 190. In this situation, network 520 will be serviced by a platform operator server 525 and will use the identified alternative network to connect its server 525 with an appliance 530 that is in the home of subscriber 140. The functions and connections between central facility 110 and its database 115 and platform operator server 520 and platform operator database 521 are the same as in local network 120 preferred embodiments shown in FIGS. 1 to 4. The High Definition audio-visual content will be delivered at the desired value of PSNR but the content will not be available for instantaneous viewing because network 500 does not have a fixed bandwidth as does communications line 190.

Progressive download is a term of art that describes a method to deliver a file, in this case a large object of High Definition audio-visual content with the content compressed using the variable bit rate (VBR) scheme, where the data rate is proportional to that required to convey the complexity of each scene. The total file size is lower than the constant bit rate (CBR) scheme, where the data rate is always running at the highest value that conveys the most complex scenes of the title. As the file is downloaded, but before it is finished, the content can be viewed as long as the file is completely downloaded just before the end of the title is viewed. The subscriber receives an alert, at 670 discussed below, when they can start the title playing and be assured that it will not stop during the viewing while more of the file is downloaded. In this way, while the quality is assured to be acceptably high the wait time is a function of the varying resources of the Internet.

Figure 6:
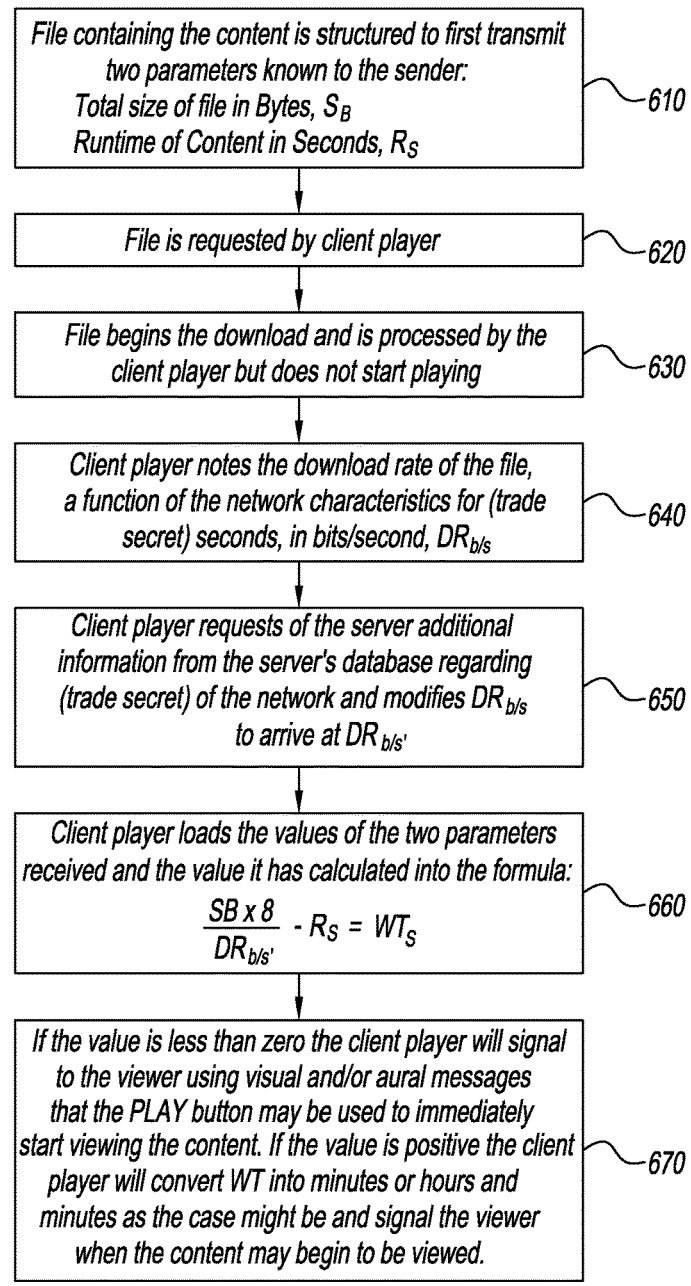
FIG. 6 is a flow diagram of the progressive download according to an embodiment of the present disclosure.

Referring to FIG. 6, at 610, a progressive download file containing the audio-visual content is structured to first transmit two parameters known to the sender: Total size of file in Bytes, $S_B$ and Runtime of Content in Seconds, $R_s$.

At 620, the file is requested by the player device (that is under control of the subscriber), hereinafter called client player. At 630, the file begins the download and is processed by the client player but does not start to play. At 640, the client player notes the download rate of the file, which is a function of the network characteristics for (trade secret) seconds, in bits/second, $DR_{b/s}$. At 650, the client player requests additional information from database 115 regarding (trade secret) of the local network 500 and modifies $DR_{b/s}$ to arrive at $DR_{b/s}'$.

At 660, the client player loads the values of the two parameters received and the value it has calculated into the formula:

$$\frac{S_B \times 8}{DR_{b/s'}} - R_S = WT_S$$

The returned value, WTs, is the Wait Time, in seconds. This is the best estimate to wait before starting the audio-visual content so that the file will have downloaded completely just as the final moments of the content are played out by the client player.

At 670, if the value is less than zero, the client player will signal to the subscriber that the PLAY button can be used to immediately start the content. If the value is positive the client player will convert WT into minutes or hours and minutes as the case might be and signal the subscriber using visual and/or aural messages when the content may be viewed.

The present system 100 first chooses parameters and values that will yield acceptable visual quality for viewing on a 42" or greater screen size in the home or residence. High Definition Formats and Image Compression using industry standard Image Compression schemes discussed above at data rates (the values) result in a PSNR of at least 42 decibels (acceptable visual quality). The present system 100 identifies and uses local networks 120 that pass ~99% of US TV Households or TV Households in the territory of interest and that can deliver those values.

Referring to all embodiments of the present disclosure, to initiate a subscription that uses the method and system of the present invention, the consumer or subscriber subscribes to a local network 120. The subscriber would be made aware of a purchase offer, (e.g., sell-through) for High Definition audio-visual content (e.g. motion pictures, TV episodes, and the like) via advertising targeted at consumers and/or subscribers of existing local network operators 120.

If the consumer or subscriber finds the offer desirable, the consumer would subscribe to the network operator (e.g. cable, IPTV, and the like), which has been licensed by the central facility based on its appropriate feature set as described above or, if already subscribing, would subscribe at the level to be able to access the offer.

The instrument for access would typically be the network operator's set top box but this appliance could be embedded in display products or be a single purpose appliance solely for the purpose of accessing the offer.

Once subscribed, the subscriber would be asked to establish a name and password, which could be created and transmitted to the local network or local network operator via email, a web-browser interface using the Internet, voice via phone, or a keyboard system of the set top box or other appliance. This name and password would stay with the subscriber regardless of the local network or local network operator after relocation or when additional local networks/operators came on line. The sole purpose of the name and password would be to purchase and access the previously purchased or owned audio-visual content regardless which local network operated fulfilled the order.

In the usual case, the local network/operator would store the name and password in a database so that any set top box associated with those login credentials could access owned and purchase content. There would be the usual local set top box password that would ensure only authorized individuals could purchase content. Other password controls would include ratings, V-chip information and other parental controls.

Once a subscriber's account is set up, the subscriber will be presented with the library of available audio-visual content, e.g. titles, for example, on screen. The subscriber can make purchases at that time and immediately view any of the titles so purchased without wait of downloads or other contention based network delays. Local network or local network operators could also offer purchases via the Internet using a browser interface or an application (aka app).

All Set Top Box's (STB's) or other appliances in the household will have access to the purchased content. Local network/operators may offer access via additional appliances that can have limitations of quality and immediacy, such as wireless devices, but this will be up to individual local network/operators. The term franchisor, as used herein, includes patent holder/licensee and licensor. The franchisor will license the franchisee, and the franchisees determine the titles to make available to their subscribers. It is expected that the franchisees will offer current popular movies and television shows, or be competitive with other like services, e.g. iTunes. However, the subscriber decides what titles, when and where, will be conveyed to his/her residence.

The above description presents the best mode contemplated for carrying out the present disclosure, and of the manner and process of making and using it, in such full, clear, concise, and exact terms as to enable any person skilled in the art to which it pertains to make and use this disclosure. However, this disclosure is susceptible to modifications and alternate constructions from that discussed above that are fully equivalent. Consequently, this disclosure is not limited to the particular embodiments disclosed. On the contrary, this disclosure covers all modifications and alternate constructions coming within the spirit and scope of the disclosure as generally expressed by the following claims, which particularly point out and distinctly claim the subject matter of this disclosure.

I claim:

1. A system for delivery of content owned by a user, comprising: a central facility for management of the content owned by the user, wherein the central facility is operatively connected to a licensor of content, and wherein the content is one or more titles of works;
a plurality of local networks operatively connected to the central facility, each of the plurality of local networks initially havingfrom none to all of the content owned by the user;
a data line dedicated to the user; and
a user location, wherein the user location is connected to at least one of the plurality of local networks via the data line,
wherein the data line transmits the content owned by the user from the local network to the user location,
wherein when the user purchases a title from one of the plurality of local networks, the
at least one of the plurality of local networks communicates with the central facility and sends purchase information to the central facility,
wherein the central facility sends the one or more titles of works to each of the plurality of local networks to ensure that each of the plurality of local networks has all of the one or more titles of works purchased by the user, and so that all of the content owned by the user is stored in the local network that the user is connected to and all of the stored content is available as high definition audio-visual content for immediate play by the user at the user location, and
wherein the content is transmitted as high definition audio-visual content via the data line, and the high definition audio-visual content is transmitted according to a definition set forth in at least one of the Society of Motion Picture and Television Engineers Standard 296M:2012, the International Telecommunications Union Rec. ITU-R BT.709-5 Part 2, and the International Telecommunications Union Rec. ITU-R BT.2020.

2. The system of claim 1, wherein the data line is a channel with fixed bandwidth.

3. The system of claim 2, wherein the channel with fixed bandwidth is a frequency domain multiplexed channel.

4. The system of claim 1, wherein the high definition audio-visual content is delivered with image compression.

5. The system of claim 4, wherein the high definition format and image compression uses data rates that result in a PSNR of at least 42 decibels.

6. The system of claim 1, wherein the central facility manages a database for the user, one or more other users and the plurality of local networks.

7. The system of claim 6, wherein the central facility transfers content amongst the plurality of local networks.

8. The system of claim 1, wherein when the user relocates to another local network on the plurality of local networks, a list of the content owned by the user is transferred to another local network.

9. A system for delivery of owned content, comprising: a location selected by a user from a local network;
a central facility for management of the content, wherein the central facility is operatively connected to a licensor of content, and wherein the content is one or more titles of works;
a plurality of local networks operatively connected to the central facility for receipt of the content from the central facility so that each of the plurality of local networks have all of the owned content; and
a high bandwidth data line, dedicated to the user, for transmission of the content between the local network and the location selected by the user, wherein the dedicated data line transmits the content as high definition content, wherein the high definition content is available for immediate play by the user at the location selected by the user, wherein when the user purchases a title from one of the plurality of local networks, the at least one of the plurality of local networks communicates with the central facility and sends purchase information to the central facility, wherein the central facility sends the one or more titles of works to each of the plurality of local networks to ensure that each of the plurality of local networks has all of the one or more titles of works purchased by the user, and wherein the high definition audio-visual content is transmitted according to a definition set forth in at least one of the Society of Motion Picture and Television Engineers Standard 296M:2012, the International Telecommunications Union Rec. ITU-R BT.709-5 Part 2, and the International Telecommunications Union Rec. ITU-R BT.2020.

10. The system of claim 9, wherein the high bandwidth data line is a channel with fixed bandwidth.

11. The system of claim 10, wherein the channel with fixed bandwidth is a frequency domain multiplexed channel.

12. The system of claim 9, wherein the central facility will deliver to one or more of the plurality of local networks content owned by the user that is missing in each of the plurality of local networks.

13. The system of claim 12, wherein the missing content is transmitted from the central facility to each of the local networks via duplex data communication lines.

14. The system of claim 1, wherein none of the user owned content is stored at the user location.

* * * * *